United States Patent Office.

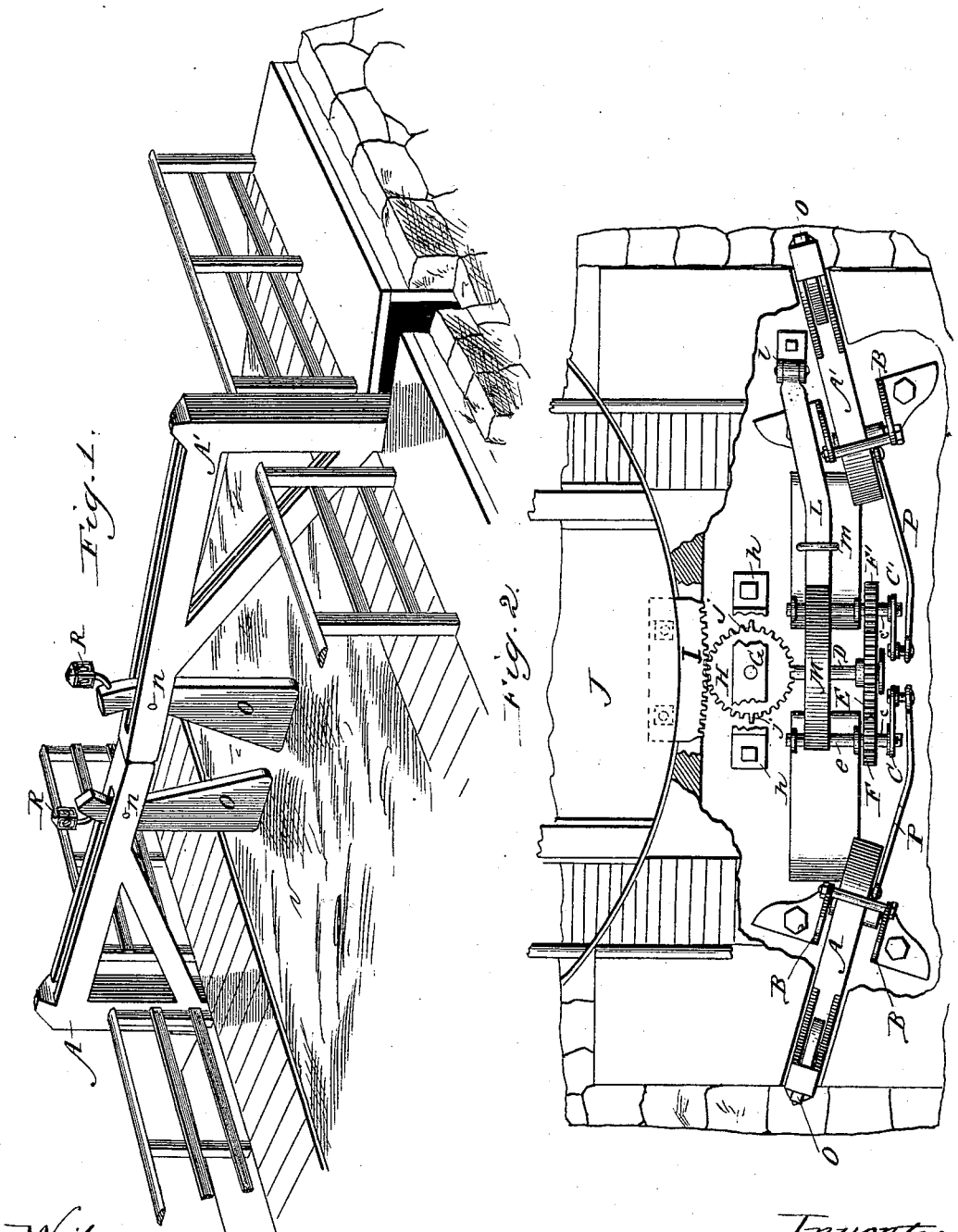

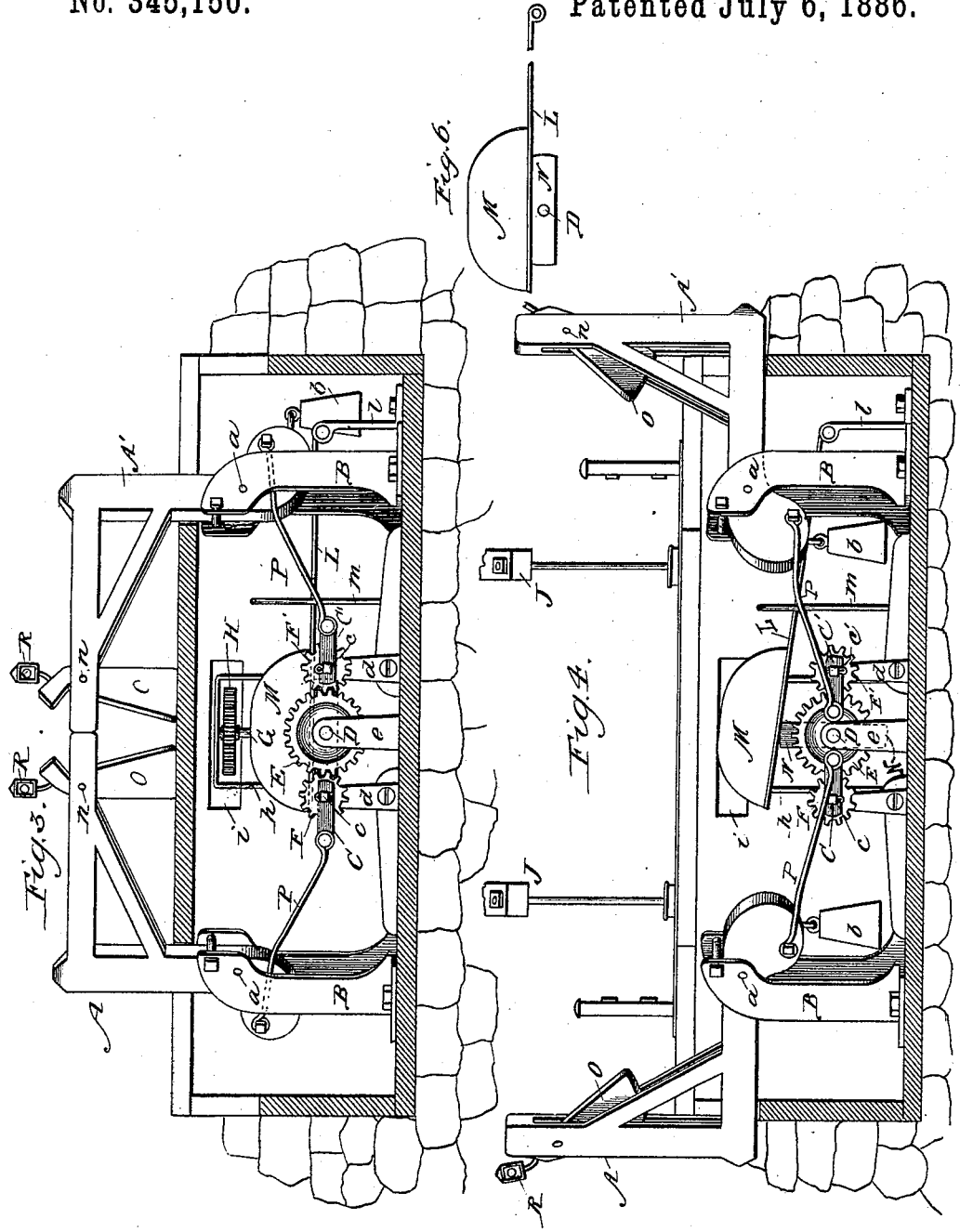

MICHAEL KOURIAN, OF CHICAGO, ILLINOIS.

BRIDGE-GATE.

SPECIFICATION forming part of Letters Patent No. 345,150, dated July 6, 1886.

Application filed December 19, 1885. Serial No. 186,128. (No model.)

*To all whom it may concern:*

Be it known that I, MICHAEL KOURIAN, a citizen of the United States of America, residing at Chicago, in the county of Cook and State of Illinois, have invented certain new and useful Improvements in Bridge-Gates, of which the following is a specification, reference being had therein to the accompanying drawings.

My invention relates to gates for drawbridges, that will be operated automatically by the turning of the draw-span; and it consists of the novel devices and combinations of devices hereinafter described, and specifically claimed.

In the accompanying drawings, Figure 1 represents a perspective view of the gate as arranged upon the abutment of a draw-bridge; Fig. 2, a plan view of the same and operating mechanism, a portion of the pavement being broken away; Figs. 3 and 4, elevations of the gates and their operating mechanism in the two extreme positions, and Figs. 5 and 6 detached detailed views of parts of the mechanism.

Corresponding letters in the several figures of the drawings designate like parts.

A and A' denote the two gates, that are L-shaped, and one shank of each, near its end, is pivoted between standards B on a pin or bolt, $a$. These standards B are secured upon the foundation-plate in a chamber below the surface of the bridge-abutment, and the gates during their operation are swung a quarter-revolution, for which purpose slotted openings are provided in the sidewalks of such abutments. The end of the shank of each gate A and A' that extends beyond or below the pivot-pin $a$ is enlarged, and has suspended a weight, $b$, for counterbalancing the upper or swinging portion of each gate. This lower enlarged end of each gate A and A' is connected by a pitman, P, with a crank, C and C', secured upon the ends of shafts $c$ and $c'$, which shafts $c$ and $c'$ are journaled in standard-bearings $d$, and intermediate of such shafts $c$ and $c'$ is journaled a shaft, D, in standard-bearings $e$ $e'$, upon which shaft D is mounted a spur-wheel, E, meshing with spur-pinions F and F', mounted upon shafts $c c'$ in a manner that a quarter-revolution of such shaft D or spur-wheel E will impart a revolution to the pinions F F', operating gates A A'.

Upon the opposite end of shaft E is mounted a miter gear-wheel, $f$, meshing with another miter-wheel, $g$, mounted on vertical shaft G, that is arranged between rear standard-bearings, $e'$, and frame $h$, and upon the upper end of shaft G is mounted a spur-wheel, H, the toothed rim of which extends through an opening, $i$, in the abutment, to engage with the teeth of a segment-gear, I, secured to the end of draw-span J of the bridge, which, with swinging open in either direction, will impart a quarter-revolution to the shaft G.

To insure a ready engagement of the teeth of segment I with the teeth of spur-wheel H, I elongate the two diametrically-opposite teeth $j$ of spur-wheel H that come to stand on the longitudinally-central line of the abutment when the draw-span J is turned away from the abutment, and the gates A A' are closed to form a barrier, and for the purpose of holding such wheel H in the exact position for such ready engagement against any free play from lost motion, I provide shaft D with two arms, N, diametrically in line with each other, which arms with their rotation will raise the vertically-swinging end of a bar, L, pivotally connected with one end to a bracket, $l$, and having secured upon its swinging end a weight, M. This bar L, being laterally guided in a frame, $m'$, will rest upon arms N, to be lifted by one or the other arm, but to be on a line with such arms when the draw-span is swung away from the abutment, and thus holding by its gravity the shaft D on the desired position.

Into the swinging end of each gate A and A', I suspend on a pin, $n$, a post, O, that by its gravity will remain on a vertical position, while the gates are swung open or are closed, and upon each such post O, I secure a lantern, R, acting as a signal at night to indicate from a distance whether the draw-bridge is in position for passage or not.

What I claim is—

1. Swinging L-shaped gates upon the abutment of a draw-bridge arranged to be automatically operated by the swinging of the draw-span and the herein-described intermediate gearing, substantially as set forth.

2. In combination with the draw-span of a bridge, L-shaped gates pivotally secured within the abutment, and arranged to be operated by the herein-described intermediate gearing engaging with a segment-gear on the end of such draw-span, substantially as set forth.

3. In combination with the draw-span of a bridge, L-shaped gates A A', pivotally secured within the abutment, connected by pitman P with cranks C C', and with suitable gearing to rotate such cranks automatically by the turning of such draw-span, substantially as set forth.

4. In combination with the draw-span of a bridge having segment-gear I on its end, L-shaped gates A A', pivotally secured within the abutment, connected by pitman P with cranks C C', and by suitable gearing with spur-wheel H, engaging with segment-gear I, substantially as and for the purpose set forth.

5. In combination with the draw-span of a bridge having segment-gear I, L-shaped gates A A', pivotally secured within the abutment, connected by pitman P with cranks C C', that are imparted motion from wheel H, engaging with segment-gear I by gear-wheels E, F, F', $f$, and $g$, substantially as set forth.

6. In combination with the draw-span of a bridge having segment-gear I, and with gates upon the abutment arranged to be opened or closed by a gear-wheel, H, having two diametrically-opposite elongated teeth, $j$, for better engagement with segment I, of arms N, secured upon a shaft, D, and of a gravitating bar, L, the same to operate substantially as described, for the purpose specified.

7. In combination with a draw-span of a bridge, L-shaped swinging gates A A', having pivotal posts O, with lanterns R, as and for the purpose set forth.

In testimony whereof I affix my signature in presence of two witnesses.

MICHAEL KOURIAN.

Witnesses:
   RICH. REINBOLD,
   HARRIS W. HUEHL.